March 3, 1959 F. W. HANNULA 2,876,404
MECHANICALLY REBALANCED SERVOSYSTEM
Filed Sept. 25, 1956 3 Sheets-Sheet 1
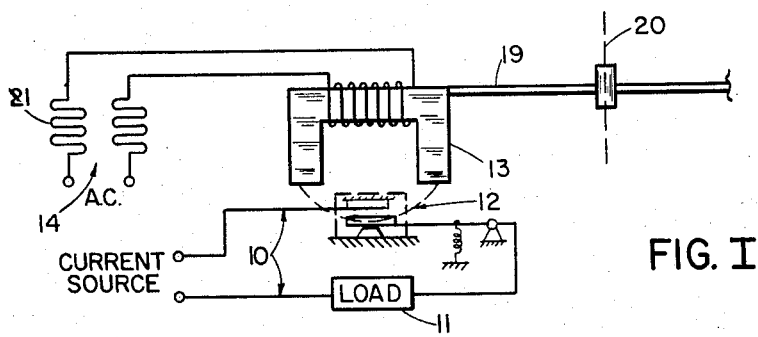
FIG. I
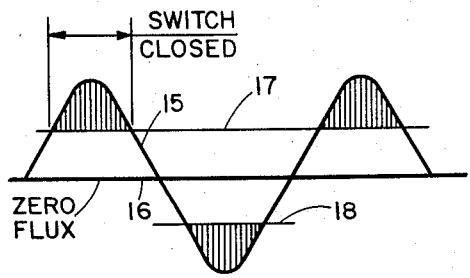
FIG. II
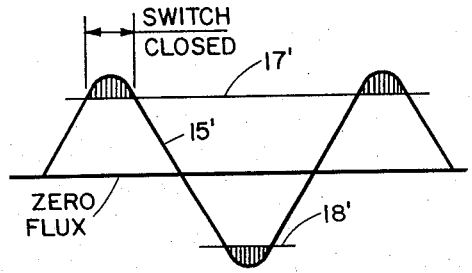
FIG. III
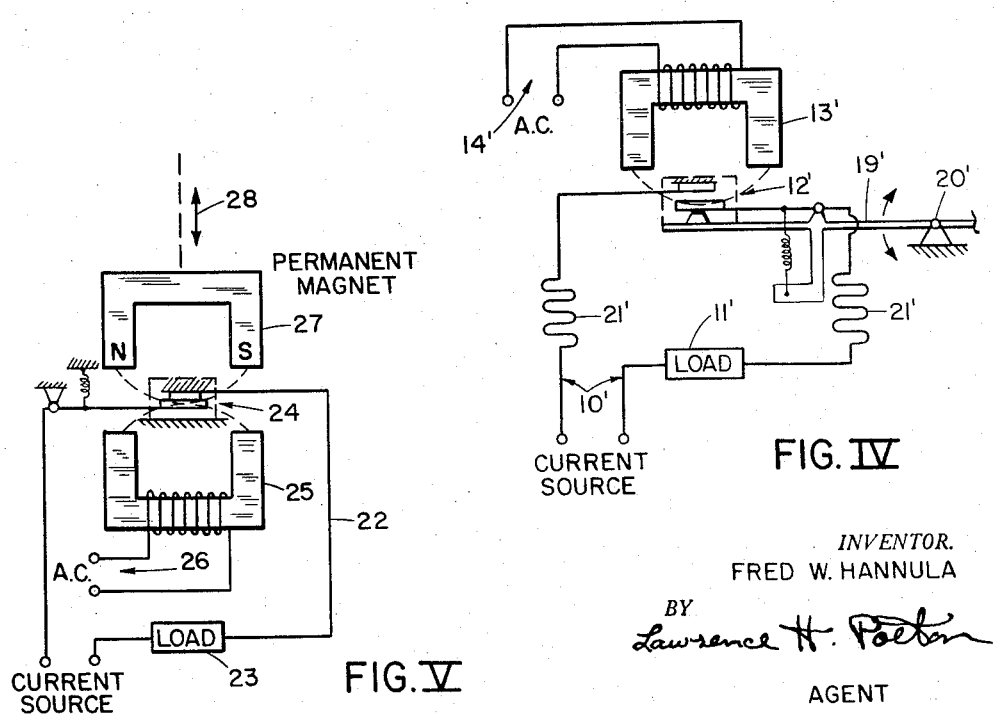
FIG. IV
FIG. V
*INVENTOR.*
FRED W. HANNULA
BY
Lawrence H. Porter
AGENT March 3, 1959  F. W. HANNULA  2,876,404
MECHANICALLY REBALANCED SERVOSYSTEM
Filed Sept. 25, 1956  3 Sheets-Sheet 2
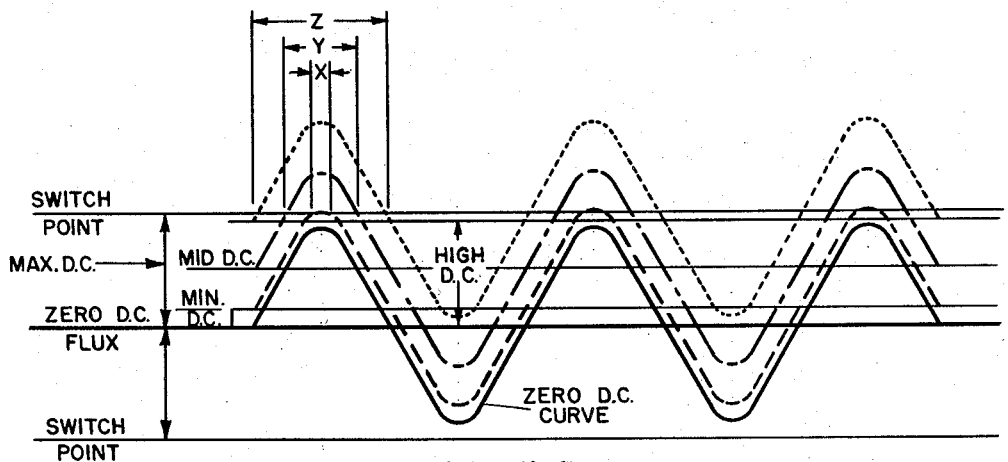
FIG. VI
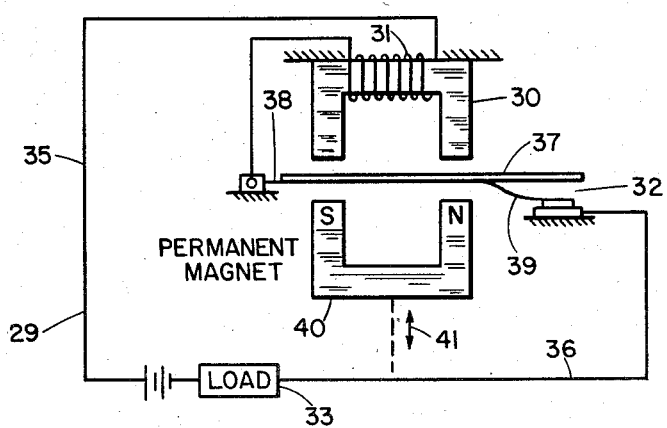
FIG. VII
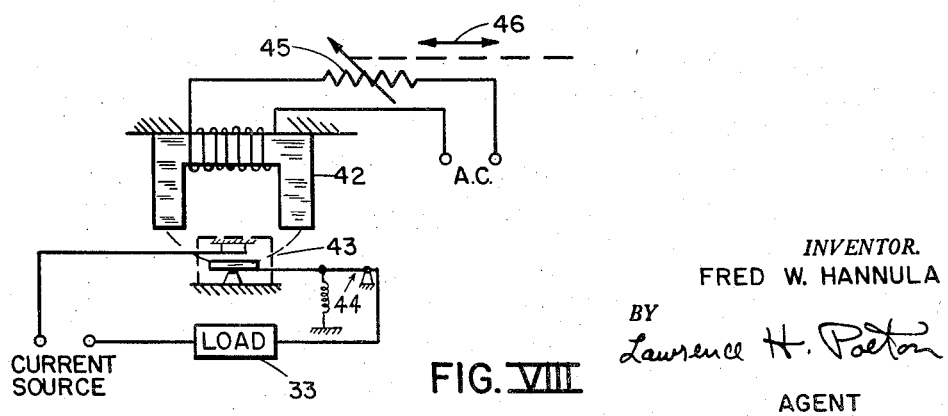
FIG. VIII
*INVENTOR.*
FRED W. HANNULA
BY Lawrence H. Poeton
AGENT March 3, 1959  F. W. HANNULA  2,876,404
MECHANICALLY REBALANCED SERVOSYSTEM
Filed Sept. 25, 1956  3 Sheets-Sheet 3
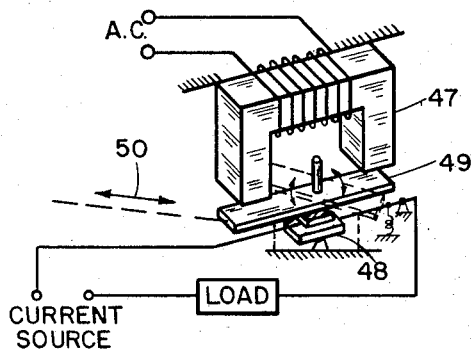
FIG. IX
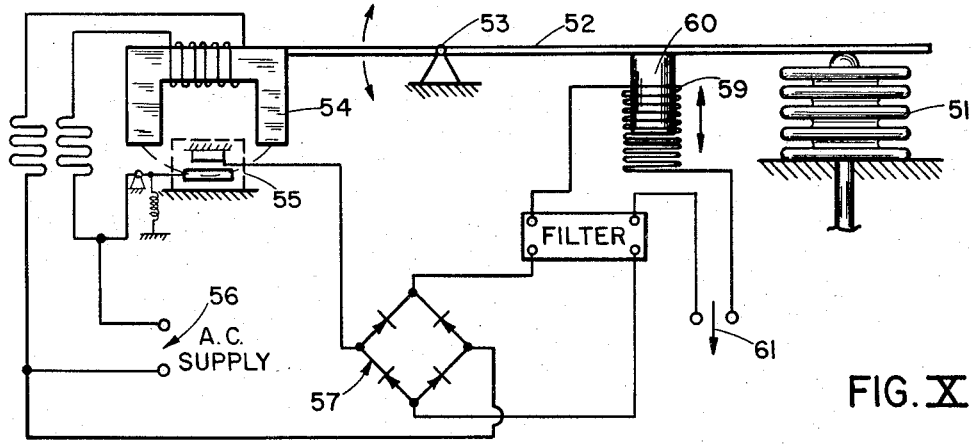
FIG. X
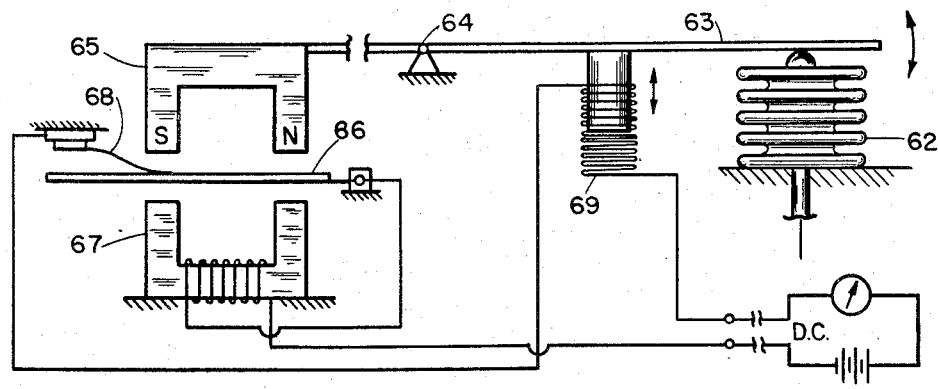
FIG. XI
*INVENTOR.*
FRED W. HANNULA
BY
Lawrence H. Poeton
AGENT United States Patent Office 2,876,404
Patented Mar. 3, 1959

2,876,404

MECHANICALLY REBALANCED SERVOSYSTEM

Fred W. Hannula, Norwood, Mass., assignor to The Foxboro Company, Foxboro, Mass., a corporation of Massachusetts Application September 25, 1956, Serial No. 611,931

10 Claims. (Cl. 318—22)

This invention relates to devices for varying the electricity in an electrical circuit. It has particular reference to an electricity valve wherein circuit closing contacts are repeatedly opened and closed in a valving process. In this manner electricity is established in a particular circuit to a degree representative of the individual and total dwell time periods of the closed condition of the valving contacts. The operation of the valving contacts is accomplished by means of controlled rise and fall of magnetic flux, and the varying factor with respect to the dwell time of the contacts is a mechanical movement as an input to the device, wherein this mechanical movement results in a variation, over a predetermined range, of the application of the rising and falling magnetic flux to the electricity valving contacts.

The device of this invention may be regarded as a mechanical movement to electric current transducer operable over a predetermined range. Devices in this general field have in the past been limited by their structure and arrangement to the production of small electric current or forces which thereafter must be substantially and relatively extensively amplified before they are usable in a practical manner.

The devices of this invention however, lend themselves readily to electrical operations of any size or strength, that is, for example, either very large or very small currents may be passed through the valving contacts of this invention, or any electrical values therebetween, simply by designing into a particular device the physical strength and dimensions necessary to carry the range of electricity which is to be valved. The device of this invention, therefore, needs no amplification of its output and its immediate output is limited only by a particular design with respect to its specific application. Thus the devices of this invention are useful in any electricity valving application other than simple on-off devices and as a specific example might be used to receive the output of a position sensing device and in response to it cause a change in current or other electrical factors of any desired size or value, limited only by the specific application design.

It is therefore an object of this invention to provide a new and improved movement operated electricity valve.

Other objects and advantages of this invention will be in part apparent and in part pointed out hereinafter, and in the accompanying drawings, wherein:

Figure I is a schematic illustration of an illustrative embodiment of this invention wherein an electromagnet is supplied with alternating current and is movable with respect to a fixed position set of electrical valving contacts as a means of varying the current in the circuit of which the contacts are a part;

Figure II is an alternating current curve illustrating the closed contact period resulting from a particular position of the electromagnet of Figure I with respect to the valving contact;

Figure III is a curve like that of Figure II and in reference to Figure I, wherein a different position of the electromagnet of Figure I is indicated as producing a different closed contact condition time period situation;

Figure IV is a variation of the device of Figure I in that the electromagnet is held in fixed position and the contacts are movable as a unit toward and away from the electromagnet;

Figure V is a schematic illustration of an alternate structure of this invention, comprising a fixed position electromagnet, a fixed position set of valving contacts and a permanent magnet movable toward and away from the contacts as the controlling factor for changing the closed condition dwell time of the valving contacts;

Figure VI is a flux variation curve relating to Figure V, showing different flux curves representing different positions of the permanent magnet of Figure V with respect to the contacts;

Figure VII schematically illustrates a further electricity valving circuit structure according to this invention, wherein a buzzer type direct current circuit is varied in its operation by relative movement with respect thereto of a permanent magnet, the whole being a direct current arrangement;

Figure VIII illustrates a further variation of this invention, wherein a fixed position electromagnet is used in conjunction with a fixed position set of electricity valving contacts and a varying strength alternating current is applied to the electromagnet by means of a variable resistor which is operated by the usual input varying mechanical movement according to this invention;

Figure IX is a schematic illustration of a further embodiment according to this invention wherein a fixed position electromagnet is used in conjunction with a fixed position set of electricity valve contacts, and wherein a cross piece somewhat in the nature of a "keeper" for the electromagnet is rotated by the varying input mechanical motion so as to vary the application of the control magnet flux to the valving contacts;

Figure X illustrates an operating system according to this invention wherein by way of illustration the arrangement of Figure I is used to provide a system involving a variable pneumatic input to produce the varying mechanical motion and an electromagnetic feedback applied to oppose the input mechanical motion tendency produced by the pneumatic input whereby an electrical output is produced which is proportional to the pneumatic input; and Figure XI is an illustration of a system comparable to that of Figure X except that the buzzer vibrator structure of Figure VII is used instead of the structure of Figure I.

The electricity valving system which is shown in Figure I as an illustrative embodiment of this invention comprises an electrical contact circuit 10 which may be powered by alternating current or direct current as desired. If alternating current is used it need only be arranged in at least approximate phase with other alternating current in this device. The circuit 10 includes any suitable load 11 and a set of contacts 12 which as a body are mounted in a fixed position but which may be opened magnetically. The opening and closing action of these contacts is the valving action referred to herein. This opening and closing action is necessarily rapid and may be described as vibratory and it is the dwell time in the closed condition of these contacts which is the variable factor of the electricity valving arrangement. That is, longer dwell time in the closed condition means more electricity in the circuit 10 and shorter dwell time means less electricity in the circuit. The most usual consideration is electrical current in this circuit being greater or less but it may be that the factor involved is voltage application or some other electrical condition. An electromagnet 13 is mounted with respect to the valving contacts 12 in such arrangement that alternating current as applied to electromagnet 13 from a source 14 produces rising and falling electromagnetic flux as applied to the contacts 12 in such a manner that the rising of the flux variable closes the contact and the spring bias of the contact arm will open the contact under falling magnetic flux conditions. This action is illustrated in Figure II wherein a rising and falling flux curve 15 is shown as related to a zero flux line 16. The flux is positive, that is, increasing on each side of the zero line since the positive and negative portions of the alternating current merely change the polarity of the electromagnet 13 so that either plus or minus portions of the alternating current produce an increase in flux from the electromagnet 13. Figure II therefore, illustrates a contact opening level of magnetic flux as indicated by line 17 on one side of the zero flux line, and line 18 on the other side of the zero flux line. These lines in crossing the magnetic flux curve define by their intersection length the extent of the closed dwell time of the switch contacts 12. The flux areas so defined are shown in shaded lines.

Variation of the dwell time of the closed condition of the valving contacts 12 is accomplished by moving the electromagnet 13 bodily toward and away from the contacts 12 to provide adjustment over and within a predetermined range. This is accomplished by mounting the electromagnet on a pivoted arm 19, Figure I, so that the movement of the arm 19 about its pivot 20 will move the electromagnet toward or away from the valving contacts 12 as the case may be. Thus this may be considered as a mechanical movement to electrical output transducer in that mechanical movement as applied to the arm 19 results in variations of the electrical current in the circuit 10 due to the change in dwell time of the valving contacts 12. This last change is illustrated in Figure III, which indicates the results of a different position of the arm 19 than that shown in Figure I wherein the electromagnet is moved further away from the contact 12 and the less of the flux curve is available to operate the contacts 12 since each flux rise must be greater to operate the contacts due to the further position of the electromagnet 13 with respect to the contacts 12.

It should be noted that the pivot 20 of the arm 19 lies essentially in the plane of the drawing so that the electromagnet 13 does not approach the magnet contacts 12 in the plane of the paper but perpendicular thereto. In this manner, any drag on the arm 19 resulting from the attraction from the electromagnet 13 and the fixed body of the contact assembly 12 is minimized due to its sliding sidwise action rather than straightaway pull. This situation can also be minimized by forming the contact arrangement and leads as much as possible of non-magnetic material. For the purpose of clarity and ease of understanding the remaining figures of the drawings are indicated as providing movement in the plane of the paper but it should be understood that either direction will be acceptable according to the needs of a particular design.

The flux level necessary to open the switch contacts 12 in Figure III is indicated at 17' and 18' with the flux curve indicated at 15'.

The illustration of this invention as shown in Figure IV is a modification of the Figure I structure in that the electromagnet 13' is mounted in fixed position and the contacts 12' are bodily mounted on a movable arm 19' so that in this structure the contacts are bodily moved with respect to electromagnet rather than the reverse as indicated in Figure I. Other parts of Figure IV are related to the structure of Figure I by the primed numbers indicating that the different parts are essentially the same.

With respect to Figure I the electrical leads to the electromagnet 13 are indicated as being variable in length as at 21 to allow for the bodily movement of the electromagnet 13. In Figure IV this same arrangement is provided with respect to the contacts 12' in that electrical leads thereto are indicated at 21' as being expansible so that the electrical contacts may be moved as a body toward and away from the electromagnet 13'.

Figure V is an illustration of an embodiment within the scope of this invention and it involves a contact circuit 22 which has a suitable load 23 and a fixed position set of valving contacts 24. A fixed position electromagnet 25 is supplied with alternating current from a source 26 and is arranged in operating relationship with respect to the contacts 24. Thus as the alternating current rises and falls the changing flux opens the contacts 24 on a flux rise and allows them to close by their own spring bias on a flux decrease. As a means of changing the dwell time of the closed condition of the contacts 24 in accordance with a mechanical movement, a permanent magnet 27 is provided and is indicated by arrow 28 as being movable toward and away from the contacts 24. Thus the permanent magnet flux and the electromagnet flux are joined in their effect upon the contacts 24 this has the effect as indicated in Figure VI of opening the contacts 24 at half the frequency of the alternating current supplied to the electromagnet 25. This is due to the fact that the polarity of the flux from the electromagnet 25 reverses with the reversal of the alternating current but the polarity of the permanent magnet flux remains the same at all times. Thus with respect to the positive condition of the alternating current the alternating current flux and the permanent magnet flux may be arranged as to be additive, and with respect to the negative condition of the alternating current, the alternating current magnetic flux and the permanent magnet magnetic flux is subtractive. Thus with reference with Figure VI, by suitable bias arrangement, the device of Figure V may be arranged so that the alternating current alone can never provide sufficient flux to open the contacts. Thus with a minimum permanent magnet flux the contact dwell time is small as at X in Figure VI and this is representative of a relatively distant position of the permament magnet with respect to the contacts 24, in Figure V. As indicated in Figure VI, the mid position of the permanent magnet travel will result in a contact dwell time indicated by the arrows Y in Figure VI as being the combination of an intermediate value permanent magnet flux as added to the electromagnet magnetic flux in the positive condition thereof and the arrows Z in Figure VI indicate a relatively long contact dwell time, which in turn represents a position of the permanent magnet of Figure V which is relatively close to the contact 24 so that in addition to the permanent magnet flux a small increment of electromagnet alternating current flux is all that is needed to open the contacts, and thus the dwell time is longer. In this manner the device of Figure V is also an electricity valving arrangement wherein a mechanical movement is transduced into an electrical output and wherein the varying factor is the dwell time of a pair of magnetically operated electrical contacts.

The embodiment illustrated in Figure VII is an electricity valving arrangement utilizing a buzzer self-driven arrangement so that the operating power aside from the signal input mechanical movement variation may be supplied through only two wires. Thus this device is particularly suitable for such applications as telemetering. This Figure VII device provides a buzzer circuit 29 with an electromagnet 30 mounted in fixed position and with the circuit including a series arrangement of the electromagnetic coil 31 and a pair of valving contacts 32. A suitable load 33 is provided as usual and a D. C. power supply is shown in the form of a battery 34. The lead wires of the circuit are indicated at 35 and 36 and may be as long as desired under suitable power supply conditions for the use of the device in an application such telemetering. In this Figure VII device the energization of the electromagnet 30 attracts the contact arm 37 which is formed of relatively substantial mass, in a bending action by means of a supporting portion 38 of the contact arm 37. A spring arm contact support 39 is secured to the main body of the contact arm 37 in the usual buzzer arm construction. The mass and inertia of the contact arm are factors in the dwell time of the contact 32 and the variable factor of the permanent magnet flux as applied in greater or less strength by the movement of a permanent magnet 40 toward and away from the contact arm 37 in representation of the input signal movement 41 provides a varying factor with respect to the dwell time of the contacts 32 in general in the manner referred to with respect to the previous figures and discussions herein.

Figure VIII illustrates a variation of the electricity valving circuits of this invention wherein a mechanical motion is transduced into an electrical output. This structure comprises a fixed position electromagnet 42 arranged in adjacency with respect to a pair of contacts 43 which are also in a fixed position and which are the valving contacts of a circuit 44 in the usual manner as described hereinbefore. The electromagnet 42 is supplied with alternating current and the rise and fall of the alternating current produces the intermittent rise and fall of the alternating current produces the intermittent rise of contact opening magnetic flux. In this particular application a variable resistor 45 is provided in the A. C. supply line to the electromagnet 42. The variation of this resistor 45 is accomplished by means of an input signal mechanical movement as indicated by arrow 46 and it may be seen that more or less resistance in the electromagnet supply will result in a variation in the amplitude of the magnetic flux from the electromagnet 42. By reference back to Figures I and II it may be seen that a variation in the amplitude of the magnetic flux has essentially the same effect on contact dwell time as does the actual movement of an electromagnet relative to the set of contacts, that is, as in Figure VIII a greater value of resistance 45 would result in a change in the dwell time of the contacts 43 and consequently a change in the electrical current in the circuit 44.

Figure IX is an illustration of yet another embodiment of this invention generally similar in its purpose, operation and structure with respect to the previously discussed electricity valving system. This particular system utilizes a fixed position electromagnet 47 supplied with alternating current and a fixed position set of contacts 48 operable in a vibratory sense by the alternating current magnetic flux. The dwell time in this instance is varied by means of a bar 49 of magnetic material which is mounted for rotation on a pivot which permits the bar 49 to be moved in rotation into and out of alignment with the poles of the electromagnet 47 somewhat in the fashion of moving a keeper or a flux guide in and out of position. This movement is accomplished by the usual input mechanical movement variation according to a variable condition signal as indicated by arrow 50. Thus it will be seen that according to the position of the flux guide bar 49 with respect to the poles of the electromagnet 47, the effective flux to reach the contacts 48, as the alternating current of the electromagnet 47 rises and falls, will be varied in accordance with the position of the bar 49. Thus again in accordance with the mechanical input movement the dwell time of the contacts 48 is varied and electricity valving action is produced.

It should be noted that in these various arrangements a pilot valve action is produced, that is, electrical current of any desired strength may be controlled in this fashion, and is limited only by the particular construction, design, and provided for a specific application of the device of this nature. This is in strong contrast to previous available devices wherein it has been attempted to produce an electrical output in response to a mechanical move-ment, such devices having been burdened with the necessity of large and expensive amplification.

The Figure X illustration denotes a pneumatic to electric transducer of the self-balancing system type based upon the electricity valving action of the structure of Figure I, as a specific example. In this arrangement an input pneumatic signal is applied to a bellows 51 as a means of moving an arm 52 about its pivot 53. The result of this action is to move an electromagnet 54 toward or away from a fixed position set of contacts 55. A single alternating current source 56 supplies alternating current to the electromagnet 54 and also to the circuit embodying the valving contacts 55. Thus in the usual manner described hereinbefore the dwell time of the contacts 55 is varied in accordance with the input pneumatic signal as applied to the bellows 51. The circuit embodying the contacts 55 thus produces a varying alternating current output which is rectified in a suitable rectifier arrangement 57 and then filtered as indicated at 58, to be thereafter applied to the coil arrangement 59 which is associated with a draw bar 60 secured to the movable arm 52 so that in solenoid fashion the movement of the arm 52 as initiated by the bellows 51 is opposed by the coil 59 as energized by the electrical output of the circuit including the contacts 55. The result of this arrangement may be seen to be an output as indicated at 61 which is an electric current representative of and proportional to the input pneumatic signal as applied initially to the bellows 51. Thus a useful self-balancing control system is provided for the provision of electrical signals in representation of pneumatic pressure changes.

The provision of a control device or a transducer device like that of Figure X through the use of a self-driven buzzer arrangement on a two wire system like that of Figure VII is another illustration of a self-balancing control system according to this invention. In the Figure XI device the pneumatic signal input bellows is indicated at 62. Its action is to tend to move an arm 63 about its pivot 64 with the resultant movement of a permanent magnet 65 toward and away from the inertia arm 66 of the buzzer arrangement which includes the electromagnet 67 and the contacts 68 the context described in connection with Figure VII. The output of this buzzer system as varied by varying dwell time of the contacts is applied to a coil 69 to oppose the action of the bellows 62 on the arm 63 so that the current in the circuit is proportional to the input pneumatic signal 62.

This invention therefore provides a new and improved electricity valving system wherein a mechanical movement is transduced into an electrical output over a predetermined range and based on the dwell time of a pair of vibrating contacts. Of particular importance in this concept is the consideration that the variable condition mechanical input movement may be produced pneumatically, hydraulically or otherwise as desired so that a variety of transducer systems may readily be achieved, all based on the mechanical to electrical transducer arrangement illustrated herein.

As many embodiments may be made of the above invention and as changes may be made in the embodiments set forth above without departing from the scope of the invention, it is to be understood that all matter hereinbefore set forth or shown in the accompanying drawings is to be interpreted as illustrative only and not in a limiting sense.

I claim:

1. An electricity valving system wherein an electrical vibrator switch is operated by a changing magnetic flux and wherein the duration of each closed condition period of said switch is varied according to changing effect of said magnetic flux on said switch in accordance with mechanical movements applied as the operational input of said system, said valving system comprising, in combination, a magnetically operable electrical switch, means for operatively applying said changing magnetic flux to said switch, means for applying an electrical current to said switch for passage therethrough when said switch is closed, and means for varying said application of said changing magnetic flux to said switch in accordance with said mechanical movements.

2. An electricity valving system wherein an electrical vibrator switch is repeatedly opened and closed by a varying magnetic flux based at least in part on a pulsating current having a wave form other than square, and wherein the duration of the closed condition period of said switch with respect to each such current pulse is varied according to changing effect of said magnetic flux on said switch in accordance with mechanical movements applied as the operational input of said system, said valving system comprising, in combination, a magnetically operable electrical switch, means for applying said varying magnetic flux to said switch, means for applying an electrical current to said switch for passage therethrough when said switch is closed, and means for changing the application of said varying magnetic flux to said switch in accordance with said mechanical movements.

3. A system for converting mechanical movement into an electrical value which is in predetermined relation thereto, said system comprising a vibrator switch and a magnetic flux producing coil mounted for relative movement with respect to each other, means for producing said movement as an operational input to said system whereby said vibrator switch is operatively exposed to said magnetic flux in varying degree in accordance with said movement, means for applying to said coil a pulsating current having a wave form other than square, and means for applying an electrical current to said switch for passage therethrough when said switch is closed.

4. A system for converting mechanical movement into an electrical value which is in predetermined relation thereto, said system comprising a vibrator switch, a coil for producing magnetic flux to operate said switch, a magnet mounted for relative movement with respect to said switch as a means of varying the effect of said coil flux on said switch, means for applying to said coil a pulsating current having a wave form other than square, and means for applying an electrical current to said switch for passage therethrough when said switch is closed.

5. A system for converting mechanical movement into an electrical value, said system comprising a vibrator switch, a coil for producing magnetic flux to operate said switch, a magnet mounted for relative movement with respect to said switch as a means of varying the effect of said coil flux on said switch by mixing and jointly applying to said switch said coil flux and the flux of said magnet, means for applying to said coil a pulsating current having a wave form other than square, and means for applying an electrical current to said switch for passage therethrough when said switch is closed.

6. A system for converting mechanical movement into an electrical value which is in predetermined relation thereto, said system comprising a vibrator switch and a magnetic flux producing coil for operating said switch, means for applying to said coil a pulsating current having a wave form other than square, means for varying the magnitude of said pulsating current in accordance with mechanical movement variations as an input to said system whereby the operation of said switch is varied, and means for applying an electrical current to said switch for passage therethrough when said switch is closed.

7. A mechanical to electrical transducer system wherein an electrical vibrator switch is operated by a changing magnetic flux and wherein the duration of each closed condition period of said switch is varied according to changing effect of said magnetic flux on said switch in accordance with mechanical movements applied as the operational input of said system, said system comprising, in combination, a vibrator switch, an alternating current electromagnet for operating said switch, a flux guide bar movable in and out of alignment with the poles of said magnet and located between said magnet and said poles whereby said movement of said flux guide bar varies the magnetic flux as applied to said contacts and consequently varies the dwell time of said contacts in representation of said flux guide movements, and means for moving said flux guide as an input action to said system.

8. An electricity valving system particularly adapted to telemetering wherein an electrical vibrator switch is operated by a changing magnetic flux and wherein the duration of each closed condition period of said switch is varied according to changing effect of said magnetic flux on said switch in accordance with mechanical movements applied as the operational input of said system, said system comprising, in combination, an electrical circuit, a magnetically operable electrical self-driven buzzer switch with the buzzer coil and contacts in series arrangement in said circuit, and means for varying the speed of operation of said buzzer switch, said last means comprising a magnet mounted for relative movement with respect to said switch in accordance with said mechanical movements, an input signal device for initiating said movements, and a system balancing magnetic coil in series in said circuit for magnetically opposing said input signal device to bring said system to a balance wherein the current in said circuit is proportional to the signal thus applied by said signal device.

9. An electricity valving system wherein an electrical vibrator switch is operated by a changing magnetic flux and wherein the duration of each closed condition period of said switch is varied according to changing effect of said magnetic flux on said switch in accordance with mechanical movements applied as the operational input of said system, said system comprising, in combination, a magnetically operable electrical switch, means for applying said varying magnetic flux to said switch in accordance with said movements, an input signal device for initiating said movements, means for applying an electrical current to said switch for passage therethrough when said switch is closed and a system balancing magnetic coil arranged for energization by said electrical current through said switch and magnetically opposing said input signal device to bring said system to a balance wherein the output current from said system balancing magnetic coil is proportional to the signal thus applied by said signal device.

10. A self-balancing pneumatic to electric transducer system comprising a movable arm with a solenoid core thereon, a pneumatic bellows for receiving an input pneumatic signal pressure and arranged to apply said signal to said arm in a tendency to produce said movement, an alternating current electromagnet mounted on said arm for bodily movement therewith, a set of magnetically operable spring biased electrical contacts operatively arranged with respect to said electromagnet so as to be repeatedly opened and closed as the flux of said alternating current electromagnet rises and falls, an electrical circuit including said contacts in making and breaking relation in said circuit, said circuit further including an alternating current rectifier, an electrical filter, and a solenoid coil in operative relation with said movable arm solenoid core, and an alternating current supply common to both said circuit and said electromagnet, with the arrangement of said system such that an increased pneumatic signal to said bellows tends to move said electromagnet toward said contacts with resultant increase in contact dwell time, consequent increase in current in said circuit and increased pull on said solenoid core in balancing opposition, with respect to said movable arm, to said increased pneumatic pressure, the output current change in said circuit therefore being proportional to said pneumatic signal increase.

(References on following page)

References Cited in the file of this patent

UNITED STATES PATENTS

| | | |
|---|---|---|
| 2,602,660 | Shannon | July 8, 1952 |
| 2,686,893 | Markson | Aug. 17, 1954 |
| 2,688,253 | Markson | Sept. 7, 1954 |
| 2,720,598 | Hall | Oct. 11, 1955 |
| 2,751,576 | Soergel et al. | June 19, 1956 |

FOREIGN PATENTS

| | | |
|---|---|---|
| 149,611 | Great Britain | Mar. 3, 1921 |